F. W. PREYER.
TOY.
APPLICATION FILED DEC. 6, 1910.

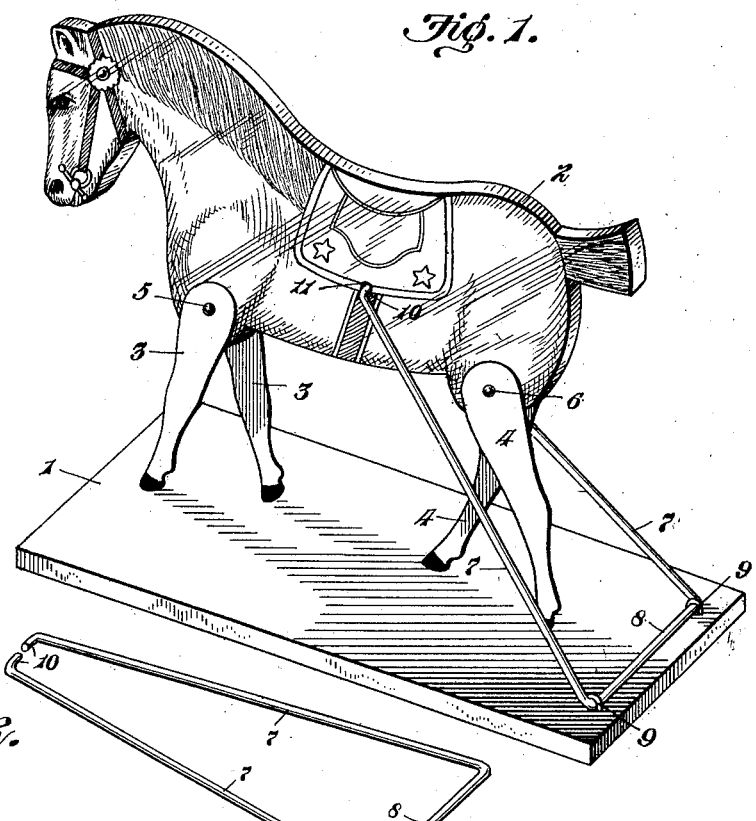
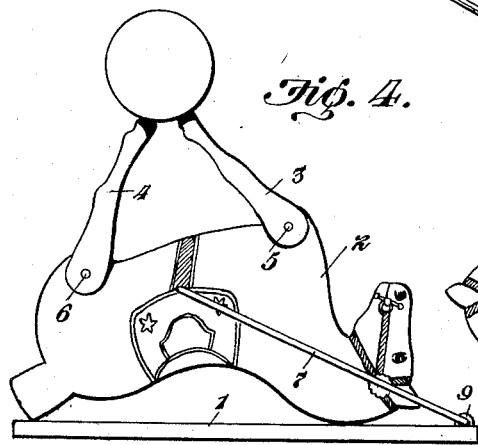
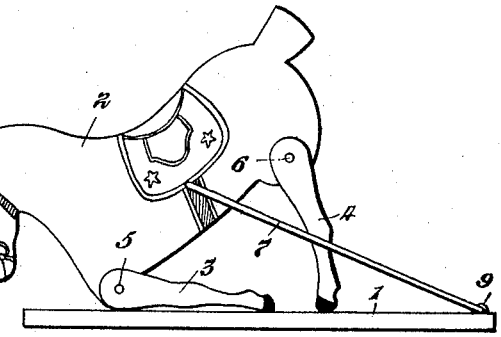

1,005,070.

Patented Oct. 3, 1911.
2 SHEETS—SHEET 2.

Witnesses:
J. H. Bishop.
Ruth A. Miller.

Inventor
Frederick W. Preyer.
By Harry Frease.
Attorney.

COLUMBIA PLANOGRAPH CO., WASHINGTON, D. C.

UNITED STATES PATENT OFFICE.

FREDERICK W. PREYER, OF CANTON, OHIO, ASSIGNOR TO THE GIBBS MANUFACTURING COMPANY, OF CANTON, OHIO, A CORPORATION OF OHIO.

TOY.

1,005,070.  Specification of Letters Patent.  Patented Oct. 3, 1911.

Application filed December 6, 1910.  Serial No. 595,859.

*To all whom it may concern:*

Be it known that I, FREDERICK W. PREYER, a citizen of the United States, residing at Canton, in the county of Stark and State of Ohio, have invented certain new and useful Improvements in Toys, of which the following is a specification.

The invention relates to a toy animal, and the object of the improvement is to combine and connect the animal with a platform in such a manner that the animal can be placed and will remain in a great variety of positions on the platform.

A preferred embodiment of the invention, in which a horse is mounted on the platform, is illustrated in the accompanying drawings, forming part hereof, in which—

Figure 5:
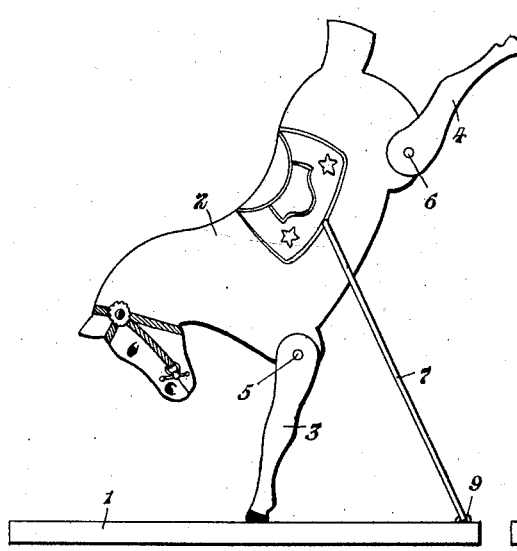
Figure 6:
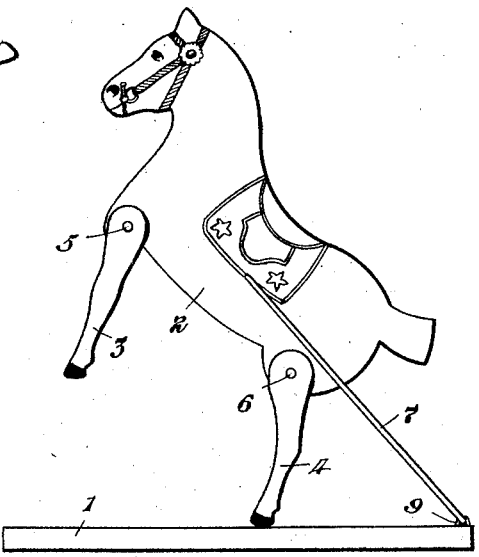
Figure 7:
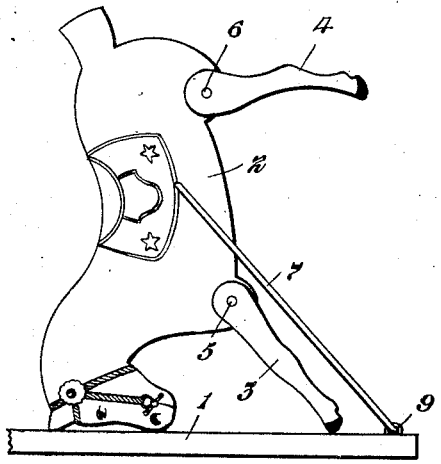
Figure 8:
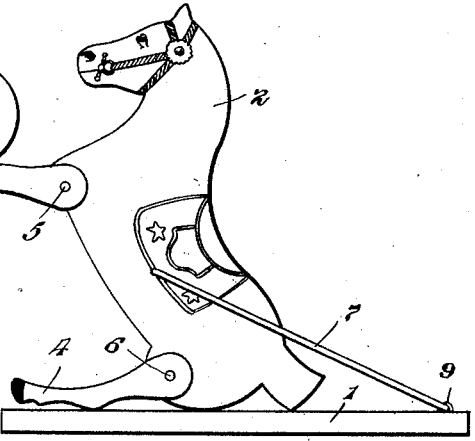

Figure 1 is a perspective view of the toy, showing the horse in normal walking position on the platform; Fig. 2, a detached perspective view of the yoke-link; Fig. 3, a side elevation showing the horse in kneeling position on the platform; Fig. 4, a similar view showing the horse on his back with a ball or cylinder resting on his legs; Fig. 5, a similar view showing the horse standing on his fore legs; Fig. 6, a similar view showing the horse standing on his hind legs; Fig. 7, a similar view showing the horse standing on his head; and Fig. 8, a similar view showing the horse in sitting posture with a ball or cylinder supported on his fore legs.

Similar numerals refer to similar parts throughout the drawings.

The platform 1 is made of any suitable material and dimensions, and is preferably somewhat longer than the length of the horse and of sufficient width to give the toy stability in all positions of the horse. The body 2 of the horse is preferably made of a thin or flat block of wood with its edges shaped, as by cutting, to the profile of the horse, and having a picture of the physical features and dress of the horse on its sides. The fore and hind leg members 3 and 4 of the horse are preferably made of sheet metal having the edges suitably cut in profile, and are frictionally jointed to the sides of the body as by means of the pivot rivets 5 and 6. The ends of these pivots are riveted to form a comparatively tight joint, so that each leg will be frictionally held in any given position as against the turning tendency of the weight of the legs or of the body.

The horse is linked to the platform by one or more connecting bars 7 of which there may be one on each side of the horse, in which event the bars preferably formed straight and diverge downward and are connected at the lower end by the yoke 8 forming a pivot which is journaled on the upper surface of the platform, preferably at or near one end thereof, as by the staple bearings 9, so that the connecting bars are free to rotate to any position above the platform; while the upper or forward ends of the bars are bent laterally inward, preferably parallel to the platform pivot, and form the horse pivots 10 which are entered from opposite sides into the transverse bearing 11 formed in the body of the horse, preferably at or near the middle thereof, and also preferably eccentric to the pivots of its legs, that is, not co-axial therewith. The link connection is preferably made longer than the greatest dimension of the horse from the pivot thereof, which permits the horse to be completely rotated on its pivot inside the platform pivot.

It will be understood that the scope of the invention is not limited to the particular form of the link connection shown in the drawings and described herein; but the two downwardly diverging bars yoked together at the lower-rear end with the inturned pivots on their upper-forward ends are preferred for the reason that the bars form stiff braces as well as links, and for the further reason that the horse can be disengaged from the links by merely springing the forward ends thereof laterally outward to withdraw the pivots from the bearing in the body of the horse, which permits the horse to be laid flatwise on the platform for neatly packing the parts for shipment. It is furthermore evident that the use of the frictional joints, or in fact of any joints at all for the legs, is not essential to the other features of the improvement; but the same are desirable for permitting a greater variety of positions of the horse.

The construction and arrangement thus set forth permits the horse to be placed and maintained in a great variety of positions on the platform, either with one or more of his legs or different parts of his body resting directly upon the platform, the link connection, and when necessary the frictional leg joints, serving to maintain the horse in the given position. And from the various possible positions shown in the drawings, it is evident that great pleasure may be derived by a child in manipulating the toy.

I claim:

1. In combination, a platform, a toy animal normally resting on the platform and having frictionally jointed members, and a link connection transversely pivoted at the upper end to the animal and pivoted at the lower end onto the platform.

2. In combination, a platform, a toy animal normally resting on the platform and having frictionally jointed members, and a link connection transversely pivoted at the upper end to the body of the animal eccentric to the member joints and pivoted at the lower end onto the platform.

3. In combination, a platform, a toy animal normally resting on the platform and having frictionally jointed legs and a link connection composed of two bars transversely pivoted at their upper ends to the sides of the animal, and having a connecting yoke at their lower ends pivoted onto the platform.

4. In combination, a platform, a toy animal normally resting on the platform and having frictionally jointed members, and a link connection composed of two bars transversely pivoted at their upper ends to the sides of the body of the animal eccentric to the member joints, and having a connecting yoke at their lower ends pivoted onto the platform.

FREDERICK W. PREYER.

Witnesses:
 WM. FELLER,
 ALBERT L. RICKER.

---

Copies of this patent may be obtained for five cents each, by addressing the "Commissioner of Patents, Washington, D. C."